US010257549B2

(12) United States Patent
Malone

(10) Patent No.: US 10,257,549 B2
(45) Date of Patent: Apr. 9, 2019

(54) ENHANCING TV WITH WIRELESS BROADCAST MESSAGES

(71) Applicant: Disney Enterprises, Inc., Burbank, CA (US)

(72) Inventor: James Malone, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 14/340,470

(22) Filed: Jul. 24, 2014

(65) Prior Publication Data
US 2016/0029048 A1 Jan. 28, 2016

(51) Int. Cl.
H04N 21/478 (2011.01)
H04N 21/41 (2011.01)
H04N 21/23 (2011.01)
H04N 21/237 (2011.01)
H04N 21/4363 (2011.01)
H04N 21/258 (2011.01)
H04N 21/4788 (2011.01)
H04N 21/25 (2011.01)
H04N 21/466 (2011.01)
H04N 21/4722 (2011.01)
H04N 21/488 (2011.01)
H04N 21/475 (2011.01)

(52) U.S. Cl.
CPC ......... H04N 21/237 (2013.01); H04N 21/252 (2013.01); H04N 21/25891 (2013.01); H04N 21/4108 (2013.01); H04N 21/4126 (2013.01); H04N 21/43637 (2013.01); H04N 21/4661 (2013.01); H04N 21/4722 (2013.01); H04N 21/4788 (2013.01); H04N 21/4886 (2013.01); H04N 21/4751 (2013.01)

(58) Field of Classification Search
CPC ......... H04N 21/44008; H04N 21/4126; H04N 21/4788; H04N 21/4661; H04N 21/252
See application file for complete search history.

(56) References Cited

U.S. PATENT DOCUMENTS 9,275,684 B2 * 3/2016 Amento ............... G11B 27/034
9,510,148 B2 * 11/2016 Jabara ..................... H04L 67/10
2009/0138805 A1 * 5/2009 Hildreth ............ G06K 9/00335
715/745
2009/0227375 A1 * 9/2009 Weisman ................ A63F 13/12
463/41

(Continued)

Primary Examiner — Brian T Pendleton
Assistant Examiner — Frank Johnson
(74) Attorney, Agent, or Firm — Farjami & Farjami LLP

(57) ABSTRACT

There is provided a system and method for enhancing television with wireless broadcast messages. The system including a television, a mobile device, and a server, wherein the television is configured to transmit a broadcast message to the mobile device, the broadcast message used by the television to request enhancement data from the server, the mobile device is configured to receive the broadcast message from the television and transmit a request to the server in response to receiving the broadcast message, and the server configured to receive the request from the mobile device and transmit the enhancement data to the television in response to receiving the request, wherein the enhancement data is used by the television to enhance media content being displayed on a display. The television may transmit the broadcast message to the mobile device using Bluetooth low energy and receive the enhancement data from the server using the Internet.

18 Claims, 9 Drawing Sheets

(56) References Cited

U.S. PATENT DOCUMENTS

| | | | | |
|---|---|---|---|---|
| 2011/0072452 | A1* | 3/2011 | Shimy | H04N 7/163 725/25 |
| 2011/0319173 | A1* | 12/2011 | Backer | A63F 13/12 463/42 |
| 2012/0011550 | A1* | 1/2012 | Holland | H04N 21/4126 725/78 |
| 2012/0072561 | A1* | 3/2012 | Rebacz | A63F 13/335 709/223 |
| 2012/0144412 | A1* | 6/2012 | Sharma | H04N 21/4126 725/13 |
| 2012/0159327 | A1* | 6/2012 | Law | H04N 21/47217 715/716 |
| 2012/0240177 | A1* | 9/2012 | Rose | H04N 21/252 725/116 |
| 2013/0098982 | A1* | 4/2013 | Adams | G06F 17/30879 235/375 |
| 2013/0174191 | A1* | 7/2013 | Thompson, Jr. | G06Q 30/0207 725/23 |
| 2013/0247121 | A1* | 9/2013 | Yuan | H04M 1/7253 725/110 |
| 2013/0347018 | A1* | 12/2013 | Limp | H04N 21/4826 725/19 |
| 2014/0067828 | A1* | 3/2014 | Archibong | H04L 65/4084 707/748 |
| 2014/0325557 | A1* | 10/2014 | Evans | H04N 21/4788 725/34 |
| 2014/0331265 | A1* | 11/2014 | Mozell | H04N 21/2668 725/93 |
| 2014/0344854 | A1* | 11/2014 | Kanojia | H04N 21/440236 725/34 |
| 2015/0012931 | A1* | 1/2015 | Ortiz | H04N 21/4126 725/25 |
| 2015/0020125 | A1* | 1/2015 | Adjemian | H04H 60/48 725/86 |
| 2015/0304727 | A1* | 10/2015 | Vandichalrajan | H04N 21/2343 725/40 |
| 2015/0373412 | A1* | 12/2015 | Park | G06K 9/00288 725/12 |
| 2016/0036939 | A1* | 2/2016 | Freund | H04L 67/306 709/204 |
| 2016/0127775 | A1* | 5/2016 | Zilberstein | G06Q 30/0271 725/34 |

* cited by examiner

ENHANCING TV WITH WIRELESS BROADCAST MESSAGES

BACKGROUND

Nowadays, consumers are looking to buy the most advanced televisions to enhance their viewing pleasure. However, televisions are not designed to enhance programs based on target consumers. For example, televisions are not able to determine which consumers are watching the programs, which programs the consumers actually want to watch, or what the television can do to enhance the viewing experience for the consumers. This may cause some consumers to have boring viewing experience, especially when he or she is not interested in the program being played on the television.

For example, if a consumer is watching a television program with other consumers, the television will not know how to enhance the viewing experience specifically for that consumer. As such, the viewing experience for the consumer will be relatively similar to the viewing experience of everybody else. For another example, if a consumer is watching a sports channel that gives sport score updates, that consumer will be provided with the same sport scores as all the other consumers that are watching the same sports channel. As such, the consumer may not be provided with sports scores that are of actual interest to the consumer.

SUMMARY

The present disclosure is directed to enhancing television with wireless broadcast messages, substantially as shown in and/or described in connection with at least one of the figures, as set forth more completely in the claims.

DETAILED DESCRIPTION

Figure 1:
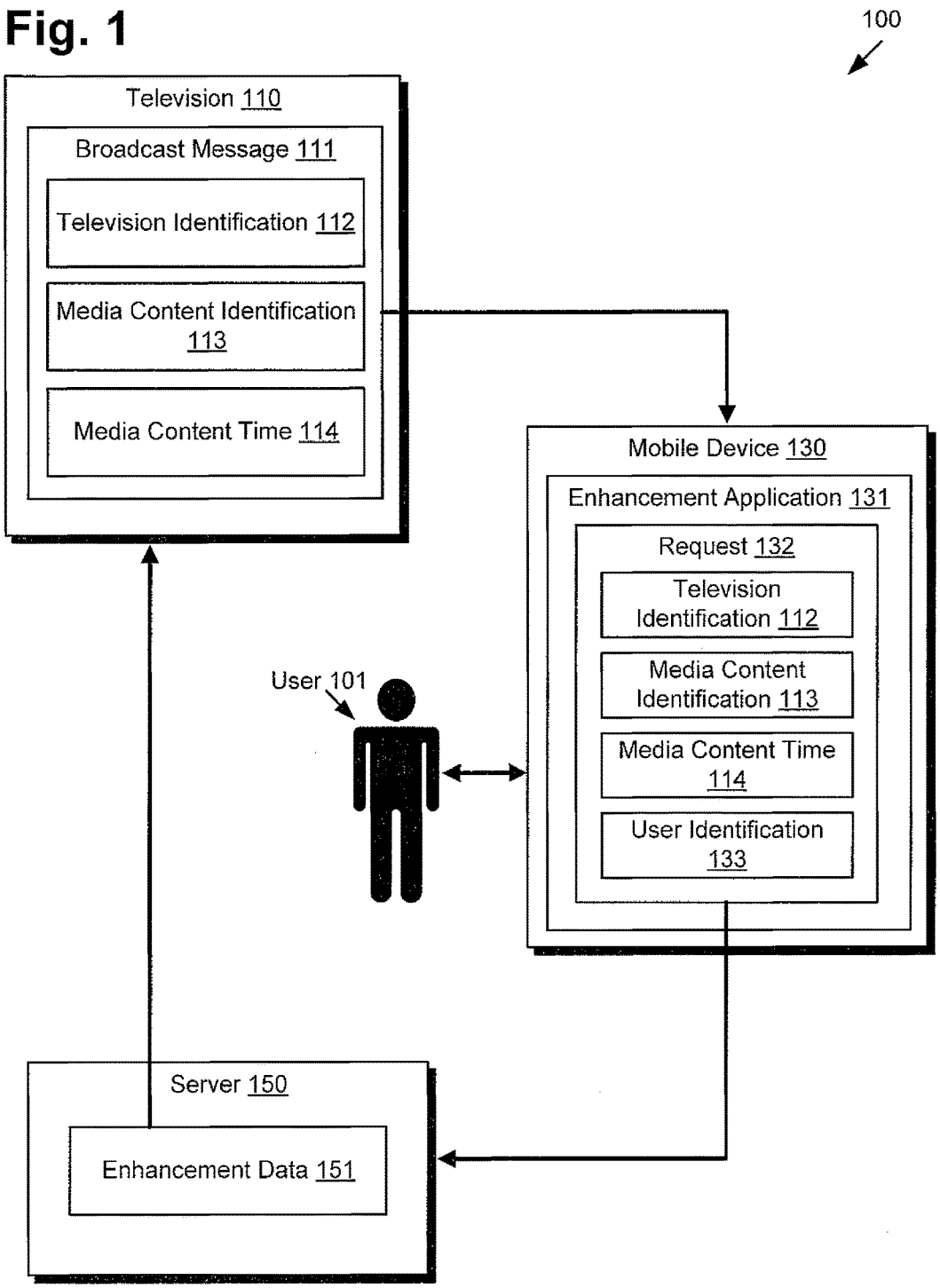
FIG. 1 presents a system for enhancing television with wireless broadcast messages, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for enhancing television with wireless broadcast messages, according to one implementation of the present disclosure. System 100 of FIG. 1 includes television 110, mobile device 130, and server 150. Television 110 includes broadcast message 111, which includes television identification 112, media content identification 113, and media content time 114. Mobile device 130 includes enhancement application 131, which includes request 132. Request 132 includes television identification 112, media content identification 113, media content time 114, and user identification 133. Server 150 includes enhancement data 151. System 100 of FIG. 1 further shows mobile device 130 is in possession of user 101.

As illustrated in FIG. 1, television 110 transmits broadcast message 111 to mobile device 130. Television 110 may include, but is not limited, a television or other display device that is capable to displaying media content to users, such as user 101. Mobile device 130 may include a mobile phone, a wearable electronic device (such as a mobile phone or computer watch), a personal computer, a tablet, or any other type of device that is capable of both receiving broadcast message 111 from television 110, and transmitting broadcast message 111 along with user identification 133 to server 150. For example, in one implementation, television 110 is a television being watched by user 101 in possession of mobile device 130, where mobile device 130 is a mobile phone.

It should be noted that the implementation of FIG. 1 only illustrates mobile device 130 as a single device, however, the present disclosure is not limited to the implementation of FIG. 1. In other implementations, mobile device 130 may include two or more devices that are in communication with each other. For example, a first device, such as a wearable device, may receive broadcast message 111 from television 110 and transmit broadcast message 111 to a second device. In such an example, the second device would then receive broadcast message 111 from the first device and transmit broadcast message 111 along with user identification 133 to server 150.

Broadcast message 111 may include a data packet transmitted by television 110 to mobile device 130 that is used by television 110 to request enhancement data 151 from server 150. Television 110 may transmit broadcast message 111 to mobile device 130 using any wired or wireless technology. For example, in one implementation, television 110 transmits broadcast message 111 to mobile device 130 using Bluetooth low energy technology. In such an implementation, broadcast message 111 corresponds to an advertisement transmitted by television 110 to mobile device 130, where the advertisement is transmitted using Bluetooth Protocols.

For example, when using Bluetooth low energy technology, the advertisement may be broadcast by television 110 on different frequency channels using a given time interval between each frequency channel. In such an example, television 110 may utilize the Bluetooth Low Energy Protocols by transmitting the advertisement using three different frequency channels with a time interval delay (such as 10 mS) between transmissions on the three frequency channels and using another time interval delay (such as 20 mS) after the transmission on the last frequency channel. Furthermore, mobile device 130 may be configured to listen to one or more of the frequency channels for receiving the advertisement from television 110.

Also illustrated in FIG. 1, broadcast message 111 includes television identification 112, media content identification 113, and media content time 114. As discussed above, television 110 includes any display device capable of displaying media content to users. Media content being displayed by television 110 may include, but is not limited to, a creative media work or project, such as a video clip, a full-length movie or animation, an episode of a drama or television series, a live or recorded sporting event, live or recorded news programs, or any other type of audiovisual work or content that can be played using television 110. As such, television identification 112 includes the identity of television 110. Media content identification 113 includes the identity of the media content that is being displayed on television 110. Finally, media content time 114 includes the current time of the media content, such as how far along the media content is that is being displayed on television 110.

For example, a consumer may be utilizing television 110 to watch a television program that is being broadcast by a television broadcasting network, where the television program includes a live soccer match. In such an example, television identification 112 would include the identity of television 110, media content identification 113 would include the identity of the live soccer match, and media content time 114 would include far along the live soccer match is, such as how much time has been played in the live soccer match.

Also illustrated in FIG. 1, after receiving broadcast message 111 from television 110, mobile device 130 utilizes enhancement application 131 to transmit request 132 to server 150. Enhancement application 131 may include a software application utilized by mobile device 130 to enhance media content that is being displayed on television 110. For example, mobile device 130 may utilize enhancement application 131 to enhance a television program that is being broadcast from a television broadcasting network and displayed on television 110. As such, mobile device 130 may come preloaded with enhancement application 131, or user 101 of mobile device 130 may download and install enhancement application 131 onto mobile device 130.

Request 132 includes a data packet transmitted by mobile device 130 to server 150, where server 150 may utilize request 132 to select enhancement data 151 used by television 110 for the enhancement of a media content. Mobile device 130 thus uses enhancement application 131 to generate request 132 by taking broadcast message 111 received from television 110 and adding user identification 133, where user identification 133 includes either the identification of user 101 in possession of mobile device 130, or user identification 133 includes the identification of mobile device 130.

For example, and using the example above where user 101 is utilizing television 110 to watch a live soccer match, television 110 may transmit broadcast message 111 to mobile device 130, where mobile device 130 is in possession of user 101. In such an example, mobile device 130 utilizes enhancement application 131 to generate request 132 using both broadcast message 111 received from television 110 and user identification 133. As such, request 132 includes television identification 112, media content identification 113, media content time 114, and user identification 133.

Also illustrated in FIG. 1, after receiving request 132 from mobile device 130, server 150 transmits enhancement data 151 to television 110, where enhancement data 151 includes any content that can be utilized by television 110 to enhance the media content that currently being displayed on television 110. For example, enhancement data 151 may include, but is not limited to, a dynamic overlay (such as text or an image) that is placed over the media content, a second media content that is displayed along with the media content, or removal of part of the media content if the media content is not appropriate for user 101. As will be illustrated in FIG. 3, server 150 may select enhancement data 151 based on request 132 and user data.

In the implementation of FIG. 1, server 150 transmits enhancement data 151 to television 110 using any wired or wireless technology. For example, server 150 may transmit enhancement data 151 to television 110 using the Internet. In such an example, television 110 may include the necessary wireless technology to be able to receive enhancement data 151 over the Internet. However, the present disclosure is not limited to the implementation of FIG. 1 and in other implementations, server 150 may utilize mobile device 130 to transmit enhancement data 151 to television 110. In such implementations, enhancement data 151 is first transmitted from server 150 to mobile device 130, and then enhancement data 151 is transmitted from mobile device 130 to television 110.

It should be noted that the implementation of FIG. 1 only illustrates one television 110, one mobile device 130, and one server 150, however, the present disclosure is not limited to the implementation of FIG. 1. For example, in other implementations, there may be any number of televisions, mobile devices, and servers. For example, in one implementation, television 110 may be transmitting broadcast message 111 to multiple mobile devices. In such an implementation, each of the mobile devices that includes enhancement application 131 will then generate a request using broadcast message 111 and transmit the request to server 150. Server 150 then uses the requests from each of the mobile devices to select and transmit enhancement data 151 to television 110.

It should further be noted that the implementation of FIG. 1 only illustrates television 110 as transmitting broadcast message 111 to mobile device 130 and receiving enhancement data 151 from server 150, however, the present disclosure is not limited to the implementation of FIG. 1. For example, in one implementation, television 110 may be connected to a separate device (not shown) that transmits broadcast message 111 to mobile device 130 and receives enhancement data 151 from server 150 similarly to television 110 discussed above. For example, the separate device may include a set-top box connected to television 110.

Figure 2:
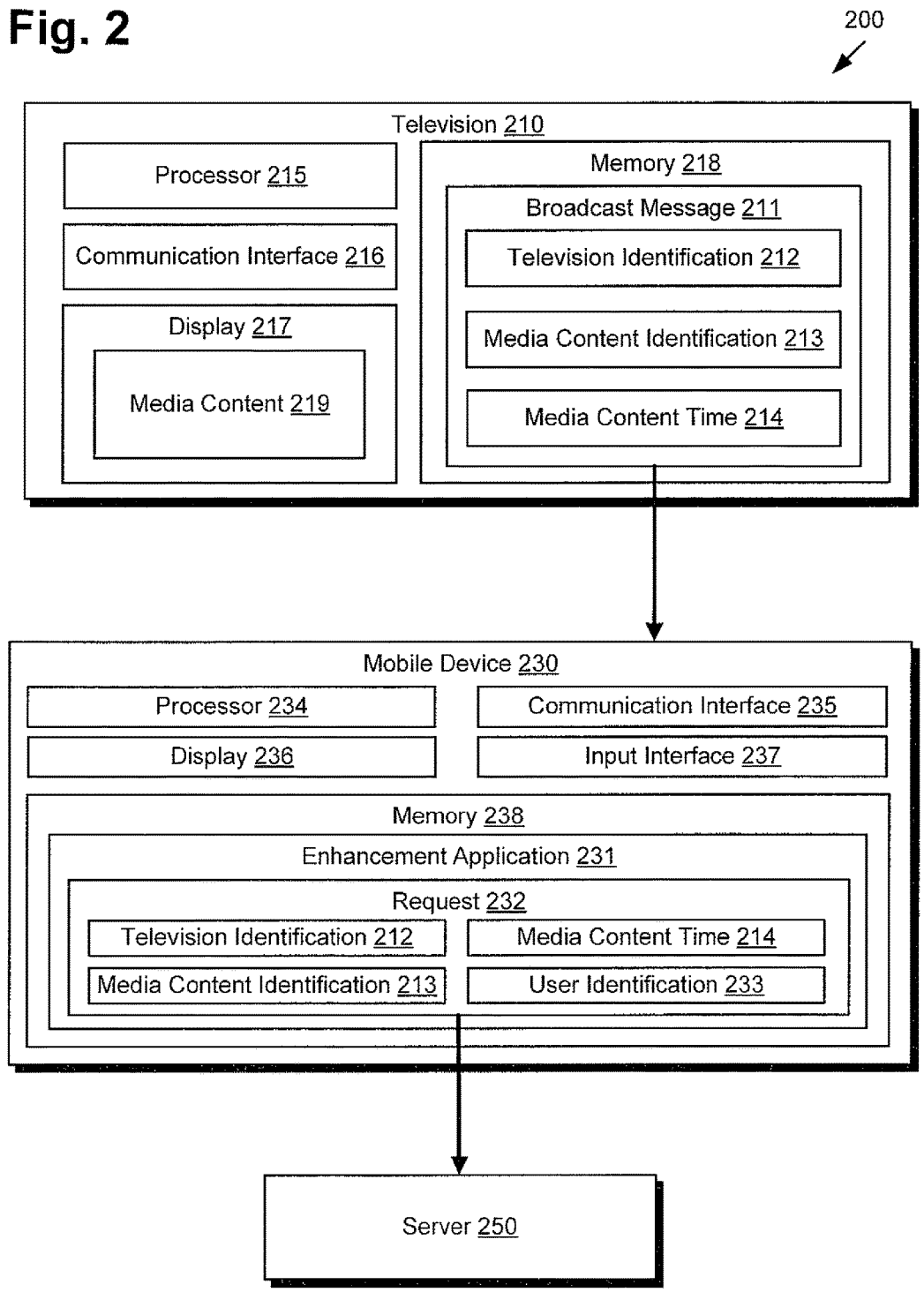
FIG. 2 presents a television that may be utilized for the enhancement of television with wireless broadcast messages, according to one implementation of the present disclosure.

FIG. 2 presents a television that may be utilized for the enhancement of television with wireless broadcast messages, according to one implementation of the present disclosure. System 200 of FIG. 2 includes television 210, mobile device 230, and server 250. Television 210 includes processor 215, communication interface 216, display 217, and memory 218. Display 217 includes media content 219. Memory 218 includes broadcast message 211, which includes television identification 212, media content identification 213, and media content time 214. Mobile device 230 includes processor 234, communication interface 235, display 236, input interface 237, and memory 238. Memory 238 includes enhancement application 231, which includes request 232. Request 232 includes television identification 212, media content identification 213, media content time 214, and user identification 233.

With regard to FIG. 2, it should be noted that television 210, broadcast message 211, television identification 212, media content identification 213, media content time 214, mobile device 230, enhancement application 231, request 232, user identification 233, and server 250 correspond respectively to television 110, broadcast message 111, television identification 112, media content identification 113, media content time 114, mobile device 130, enhancement application 131, request 132, user identification 133, and server 150 from FIG. 1.

As illustrated in FIG. 2, television 210 includes processor 215 and memory 218. Processor 215 may be configured to access memory 218 to store received input or to execute commands, processes, or programs stored in memory 218, such as broadcast message 211. Processor 215 may correspond to a processing device, such as a microprocessor or similar hardware processing device, or a plurality of hardware devices. However, in other implementations processor 215 refers to a general processor capable of performing the functions required by television 210. Memory 218 is capable of storing commands, processes, and programs for execution by processor 215. Memory 218 may be instituted as ROM, RAM, flash memory, or any sufficient memory capable of storing a set of commands. In other implementations, memory 218 may correspond to a plurality memory types or modules.

Also illustrated in FIG. 2, television 210 includes communication interface 216. Television 210 may transmit broadcast message 211 to mobile device 230 and receive enhancement data (such as enhancement data 151 from FIG. 1) from server 250 using communication interface 216, where communication interface 216 corresponds to a wireless device. As such, communication interface 216 may utilize, but is not limited to, one or more of a satellite transmission, Wireless Fidelity (Wi-Fi), Worldwide Interoperability for Microwave Access (WiMax), ZigBee, Bluetooth, Bluetooth low energy, Algorithm Division Multiple Access (CDMA), Evolution-Data Optimized (EV-DO), Global System for Mobile Communications (GSM), Long Term Evolution (LTE). For example, and as illustrated in FIG. 1, television 110 may transmit broadcast message 111 to mobile device 130 using Bluetooth low energy and receive enhancement data 151 from server 150 using the Internet.

With regard to FIG. 2, it should be noted that processor 234, communication interface 235, and memory 238 of mobile device 230 may be similar to processor 215, communication interface 216, and memory 218 of television 210. For example, processor 234 of mobile device 230 may be configured to access memory 238 to store received input or to execute commands, processes, or programs stored in memory 238, such as enhancement application 231. As such, memory 238 is capable of storing commands, processes, and programs for execution by processor 234. Furthermore, communication interface 235 of mobile device 230 may utilize any of the wired or wireless technologies discussed above.

Also illustrated in FIG. 2, display 217 of television 210 is displaying media content 219. As discussed above, media content 219 may include, but is not limited to, a creative media work or project, such as a video clip, a full-length movie or animation, an episode of a drama or television series, a live or recorded sporting event, live or recorded news programs, or any other type of audiovisual work or content that can be played using television 210. As such, in the implementation of FIG. 2, media content identification 213 includes the identification of media content 219, such as the name of media content 219, and media content time 214 includes how much long media content 219 has been playing for.

It should be noted that, in one implementation, media content 219 may include a stored program within television 210. For example, in such an implementation, media content 219 may have been provided by a television network and stored in memory 218 of television 210, or stored in an external memory (not shown) connected to television 210. In such an example, a user of television 210 may have chosen to watch media content 219 by searching through memory 218, or the external memory, and selecting media content 219.

As illustrated in the implementation of FIG. 2, television 210 generates broadcast message 211 based on media content 219. As such, television identification 212 includes the identity of television 210, media content identification 213 includes the identity of media content 219, and media content time 214 includes how long media content 219 has been playing for. After generating broadcast message 211, television 210 transmits broadcast message 211 to mobile device 230.

After receiving broadcast message 211 from television 210, mobile device 230 uses broadcast message 211 and user identification 233 to generate request 232. For example, mobile device 230 may use enhancement application 231 to generate request 232, where request 232 includes television identification 212, media content identification 213, and media content time 214 from broadcast message 211, and user identification 233. Mobile device 230 then transmits request 232 to server 250.

Figure 3:
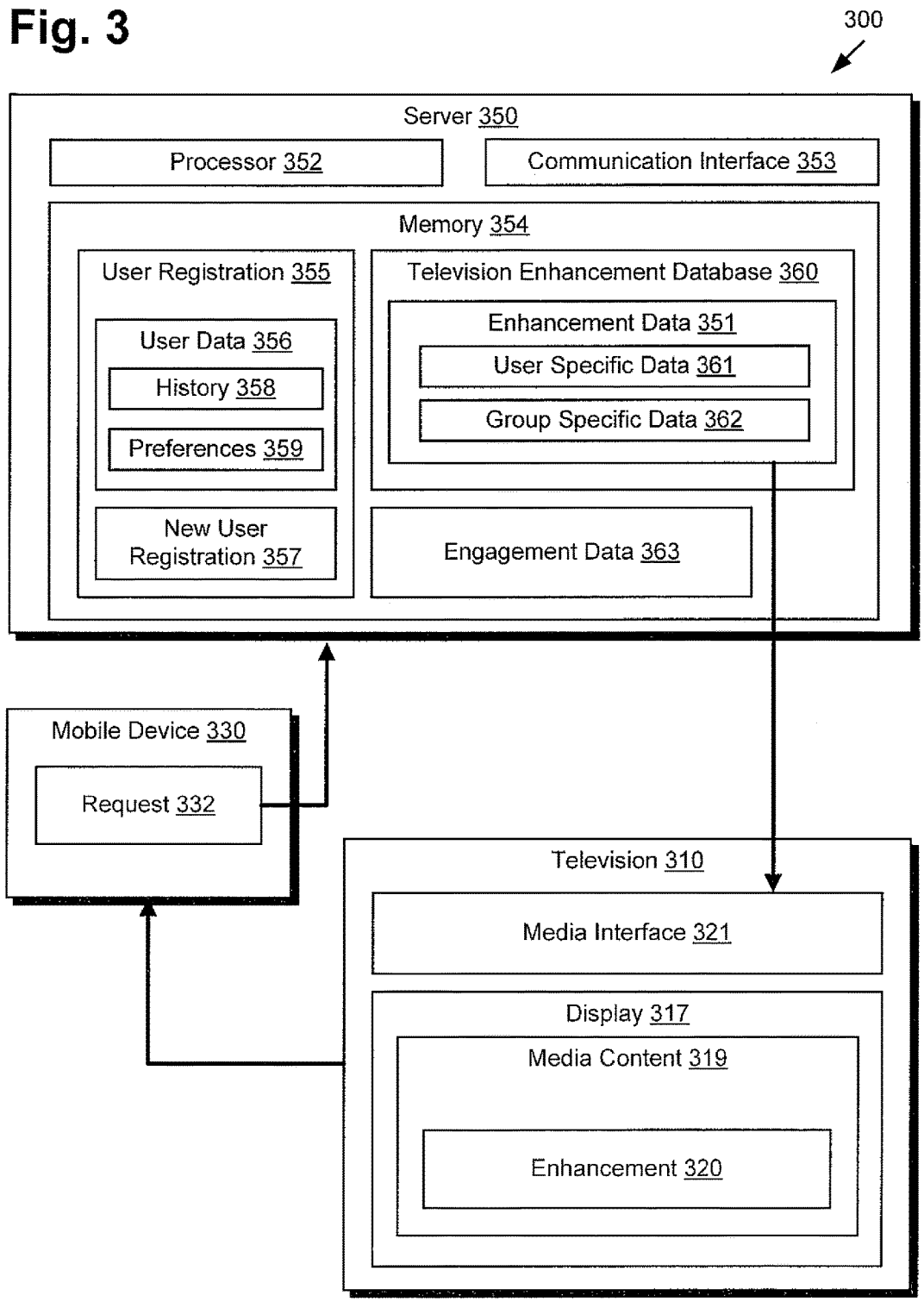
FIG. 3 presents a server that may be utilized for the enhancement of television with wireless broadcast messages, according to one implementation of the present disclosure.

FIG. 3 presents a server that may be utilized for the enhancement of television with wireless broadcast messages, according to one implementation of the present disclosure. System 300 of FIG. 3 includes television 310, mobile device 330, and server 350. Television 310 includes display 317. Display 317 includes media content 319, which includes enhancement 320. Mobile device 330 includes request 332. Server 350 includes processor 352, communication interface 353, and memory 354. Memory 354 includes user registration 355, television enhancement database 360, and engagement data 363. User registration 355 includes user data 356 and new user registration 357. User data 356 includes history 358 and preferences 359. Television enhancement database 360 includes enhancement data 351, which includes user specific data 361 and group specific data 362.

With regard to FIG. 3, it should be noted that television 310, mobile device 330, request 332, server 350, and enhancement data 351 correspond respectively to television 110, mobile device 130, request 132, server 150, and enhancement data 151 from FIG. 1. It should further be noted that television 310, display 317, media content 319, mobile device 330, request 332, and server 350 correspond respectively to television 110, display 117, television program 119, mobile device 130, request 132, and server 150 from FIG. 1.

As illustrated in FIG. 3, server 350 includes processor 352, memory 354, and communication interface 353. Processor 352 may be configured to access memory 354 to store received input or to execute commands, processes, or programs stored in memory 354, such as user registration 355 and television enhancement database 360. Processor 352 may correspond to a processing device, such as a microprocessor or similar hardware processing device, or a plurality of hardware devices. However, in other implementations processor 352 refers to a general processor capable of performing the functions required of server 350. Memory 354 is capable of storing commands, processes, and programs for execution by processor 352. Memory 354 may be instituted as ROM, RAM, flash memory, or any sufficient memory capable of storing a set of commands. In other implementations, memory 354 may correspond to a plurality memory types or modules. Communication interface 353 may utilize any of the wired or wireless technologies discussed above with regard to communication interface 216 from FIG. 2.

Also illustrated in FIG. 3, server 150 includes user registration 355. Server 350 utilizes user registration 355 to both register new users that have not been registered to a particular television using new user registration 357, or select enhancement data 351 for a particular user using user data 356 if that user is already registered. For example, if a user of mobile device 330 has not registered with television 310, server 150 may use new user registration 357 to register that user with television 310. In such an example, server 350 may further store the user as having been registered with television 310 in user data 356. As such, the user of mobile device 330 will only have to register one time for each television with server 350 to utilize server 350 when enhancing media content.

Server 350 selects enhancement data 351 for a specific user using user data 356, which includes history 358 and preferences 359. History 358 may include all of the previous media content the particular user has watched in the past. For example, each time the user of mobile device 330 transmits request 332 to server 350, server 350 may store the media content corresponding to the media content identification from request 332 in history 358. Preferences 359 may include different preferences set by the user of mobile device 330 for selecting enhancement data 351. For example, preferences may include, but are not limited to, the user's favorite sports teams, fantasy teams, address, gender, friends, social websites, favorite games, or any other preferences the user can provide. Server 350 may then utilize history 358 and preferences 359 when selecting enhancement data 351 for the user of mobile device 330.

For example, history 358 for a user of mobile device 330 may include the user likes to watch Pittsburgh Steelers football games. In such an example, if the user is now watching a football game on television 310 that does not include the Pittsburgh Steelers, such as media content 319, server 350 may utilize history 358 to select enhancement data 351 that includes score updates for the Pittsburgh Steelers game. For another example, preferences 359 for the user of mobile device 330 may include the user's fantasy football team. In such an example, while the user is watching a football game on television 310, server 350 may utilize preferences 359 to select enhancement data 351 that includes statistical updates for the players on the user's fantasy football team.

Also illustrated in FIG. 3, enhancement data 351 includes user specific data 361 and group specific data 362. When selecting enhancement data 351 to be transmitted to television 310, server 350 can either select enhancement data 351 that is specific to a particular user watching television 310, such as user specific data 361, or server 350 can select enhancement data 351 that is specific to a group of users watching television 310, such as group specific data 362. For example, if only the user of mobile device 330 is watching television 310, server 350 would select user specific data 361 that is specific to that user. However, if the user of mobile device 330 has friends also watching television 310 that have their own mobile devices, server 350 may select group specific data 362, where group specific data 362 would include enhancement data 351 that is specific to all of the users watching television 310.

For example, if a first user watching television 310 likes the Pittsburgh Steelers and a second user watching television 310 likes the Denver Broncos, server 350 may select group specific data 362 that includes score updates for both of the Pittsburgh Steelers and the Denver Broncos. For a second example, if a first user watching television 310 has a favorite football player playing in the football game on television 310 and a second user watching television 310 has a different favorite football player also playing in the football game, server 350 may select group specific data 362 that includes an overlay on the football game showing where each of the two favorite football players are located, as will be illustrated in FIG. 5B.

It should be noted that server 350 may utilize more than user data 356 to select enhancement data 351. In one implementation, server 350 may utilize the identity of the media content being watched by the user of mobile device 330 to select enhancement data 351. For example, if the user is watching a sporting match, server 350 may utilize the identity of the sporting match and select advertisements for sporting equipment and clothes as enhancement data 351. In a second implementation, server 350 may utilize the media content time of the media content being watched by the user of mobile device 330 to select enhancement data 351. For example, if server 350 determines the user did not watch an advertisement during a television program, such as by fast forwarding past it, server 350 may select a similar advertisement for enhancement data 351 to be displayed during the television program. Finally, in a third implementation, server 350 may utilize the identity of television 310 to select enhancement data 351.

Also illustrated in FIG. 3, television 310 receives enhancement data 351 using media interface 321. Media interface 321 may be utilized by television 310 to receive both audio and video content from other devices. For example, if media content 319 corresponds to a television program received by a television broadcasting network, television 310 may utilize media interface 321 to receive both the television program from the television broadcasting network and the enhancement content from server 350.

Also illustrated in FIG. 3, media content 319 includes enhancement 320. Enhancement 320 may include the enhanced content transmitted to television 310 from server 350 that is used enhance media content 319. As such, enhancement 320 may include, but is not limited to, a dynamic overlay (such as text or an image) that is placed over media content 319, a second media content that is displayed along with media content 319, or removal of part of media content 319 if media content 319 is not appropriate for the current user. For example, enhancement 320 may include an advertisement displayed on media content 319.

Also illustrated in FIG. 3, server 350 includes engagement data 363. Engagement data 363 may include data collected by server 350 that corresponds to the viewing habits of users watching televisions, such as the user of mobile device 330 watching television 310. For example, engagement data 363 may include the number of users watching a media content based on demographics and time. Server 350 may thus record engagement data 363 using requests received from mobile devices, such as receiving request 332 from mobile device 330.

In the implementation of FIG. 3, mobile device 330 transmits request 332 to server 350. After receiving request 332 from mobile device 330, server 350 utilizes request 332 along with user data 356 to select enhancement data 351. For example, server 350 may use the identity of media content 319 or user data 356 to select enhancement data 351. After selecting enhancement data 351, server 350 transmits enhancement data 351 to television 310 to be displayed on media content 319 as enhancement 320.

Figure 4:
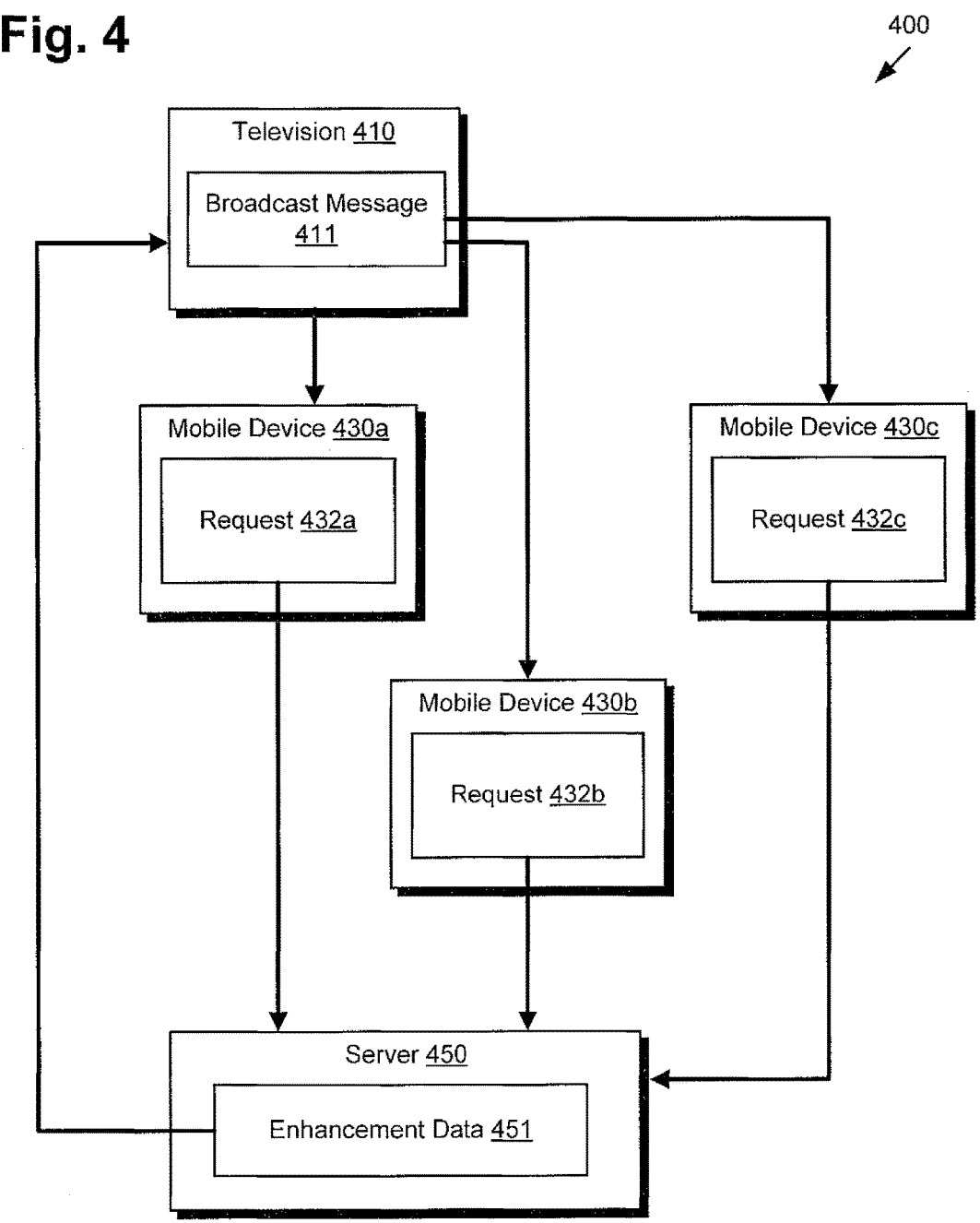
FIG. 4 presents an example of enhancing a television for multiple users using wireless broadcast messages, according to one implementation of the present disclosure.

FIG. 4 presents an example of enhancing a television for multiple users using wireless broadcast messages, according to one implementation of the present disclosure. System 400 of FIG. 4 includes television 410, mobile device 430a, mobile device 430b, mobile device 430c (collectively referred to as mobile devices 430), and server 450. Television 410 includes broadcast message 411. Mobile device 430a includes request 432a, mobile device 430b includes request 432b, and mobile device 430c includes request 432c (collectively referred to as requests 432). Server 450 includes enhancement data 451. With regard to FIG. 4, it should be noted that television 410, broadcast message 411, each of mobile devices 430, each of request 432, server 450, and enhancement data 451 correspond respectively to television 110, broadcast message 111, mobile device 130, request 132, server 150, and enhancement data 151 from FIG. 1.

As discussed above, in one implementation, server 450 may select enhancement data 451 based on multiple users. For example, and as illustrated in FIG. 3, server 350 may select group specific data 362, where group specific data 362 includes enhancement data 351 that is specific to more than one user watching television 310. As such, and as illustrated in FIG. 4, television 410 transmits broadcast message 411 to multiple mobile devices, such as mobile devices 430. Each of mobile devices 430 then generate one of requests 432 using broadcast message 411, and then transmits requests 432 to server 450.

For example, mobile device 430a generates request 432a using broadcast message 411 received from television 410 and adding an identity of a user of mobile device 430a. Mobile device 430a then transmits request 432a to server 450. For a second example, mobile device 430b generates request 432b using broadcast message 411 received from television 410 and adding an identity of a user of mobile device 430b. Mobile device 430b then transmits request 432b to server 450. Finally, for a third example, mobile device 430c generates request 432c using broadcast message 411 received from television 410 and adding an identity of a user of mobile device 430c. Mobile device 430c then transmits request 432c to server 450.

After receiving requests 432 from mobile devices 430, server 450 may then utilize requests 432 to select enhancement data 451, where enhancement data 451 is specific to all of the users in possession of mobile devices 430. Server 450 then transmits enhancement data 451 to television 410 so that television 410 can enhance the television program being watched by each of the users.

As a preliminary note to FIGS. 5A-5D, FIGS. 5A-5D illustrate examples of enhancing a media content. Each of FIGS. 5A-5D includes display 517, media content 519, and enhancement 520. With regard to FIGS. 5A-5D, display 517 and media content 519 correspond respectively to display 217 and media content 219 from FIG. 2. Furthermore, display 517, media content 519, and enhancement 520 correspond respectively to display 317, media content 319, and enhancement 320 from FIG. 3. It is also noted that the examples will be discussed with regards to media content 519 including a live soccer match.

Figure 5A:
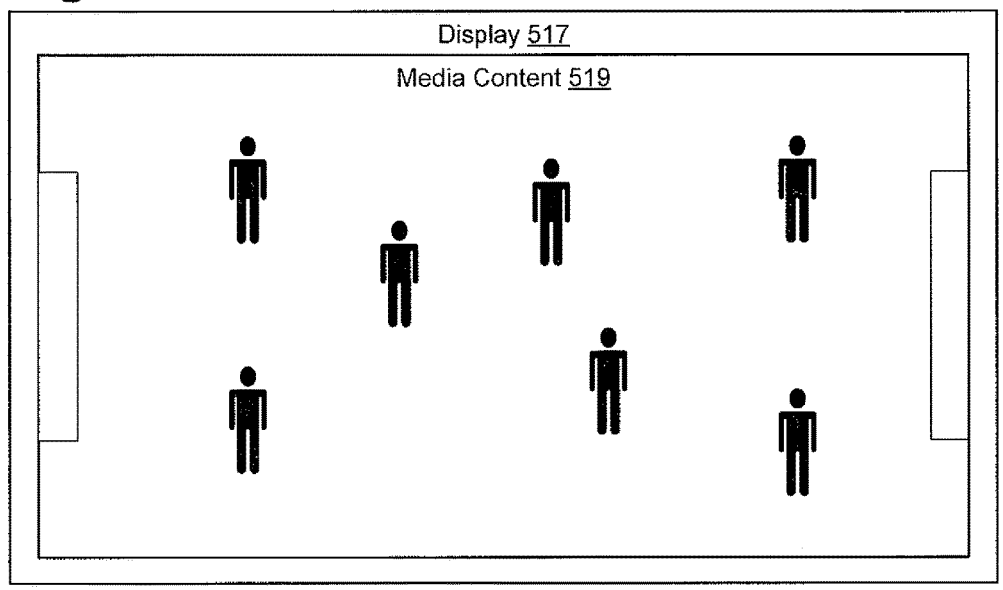
FIG. 5A presents an example of a media content, according to one implementation of the present disclosure.

FIG. 5A presents an example of a media content, according to one implementation of the present disclosure. As illustrated in FIG. 5A, display 517 is displaying media content 519, which, as discussed above, includes a live soccer match. The user watching media content 519 may want to enhance media content 519 based on the user's preferences. For example, and using FIG. 1, a user in possession of mobile device 130 may wish to enhance media content 519 that is being displayed on television 110. As will be illustrated in FIGS. 5B-5D, there are multiple ways in which media content 519 may be enhanced for the user.

Figure 5B:
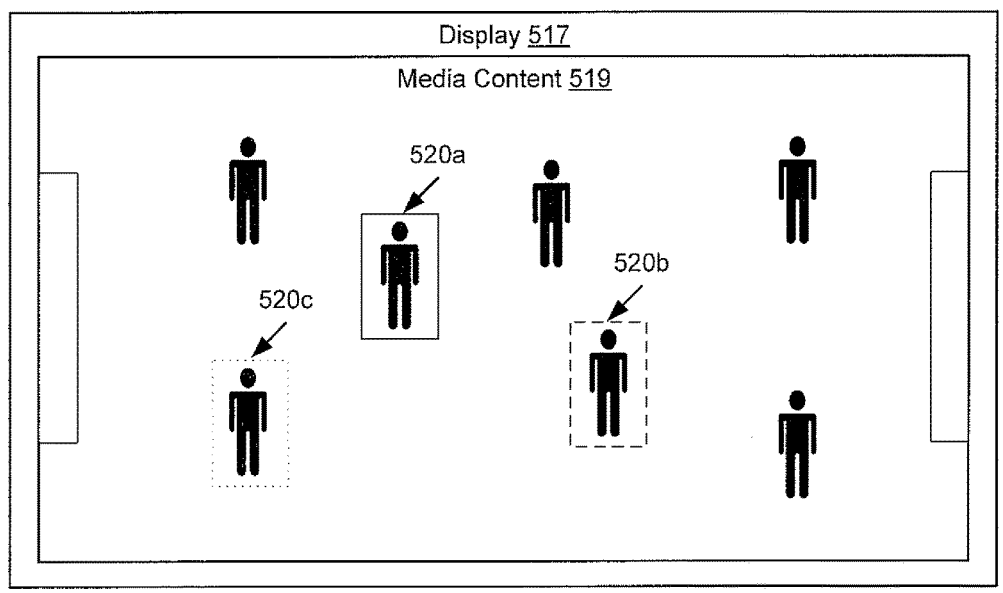
FIG. 5B presents a first example of enhancing a media content, according to one implementation of the present example.

FIG. 5B presents a first example of enhancing a media content, according to one implementation of the present example. As illustrated in FIG. 5B, media content 519 on display 517 has been enhanced using enhancement 520a, enhancement 520b, and enhancement 520c, collectively referred to as enhancements 520. Enhancement 520a includes an overlay identifying a first player from media content 519, as illustrated by the solid rectangle. Enhancement 520b includes an overlay identifying a second player from media content 519, as illustrated by the dashed rectangle. Finally, enhancement 520c includes an overlay identifying a third player from media content 519, as illustrated by the dotted rectangle.

FIG. 5B may thus be illustrating an example of a group specific enhancement, such as television 310 receiving group specific enhancement 362 from server 350 in FIG. 3. As such, a first user's favorite player from the live soccer match of media content 519 may include the player marked with enhancement 520a. A second user's favorite player from the live soccer match of media content 519 may include the player marked with enhancement 520b. Finally, a third user's favorite player from the live soccer match of media content 519 may include the player marked with enhancement 520c. By marking players from the live soccer match, media content 519 has been enhanced based on a group of users' preferences.

Figure 5C:
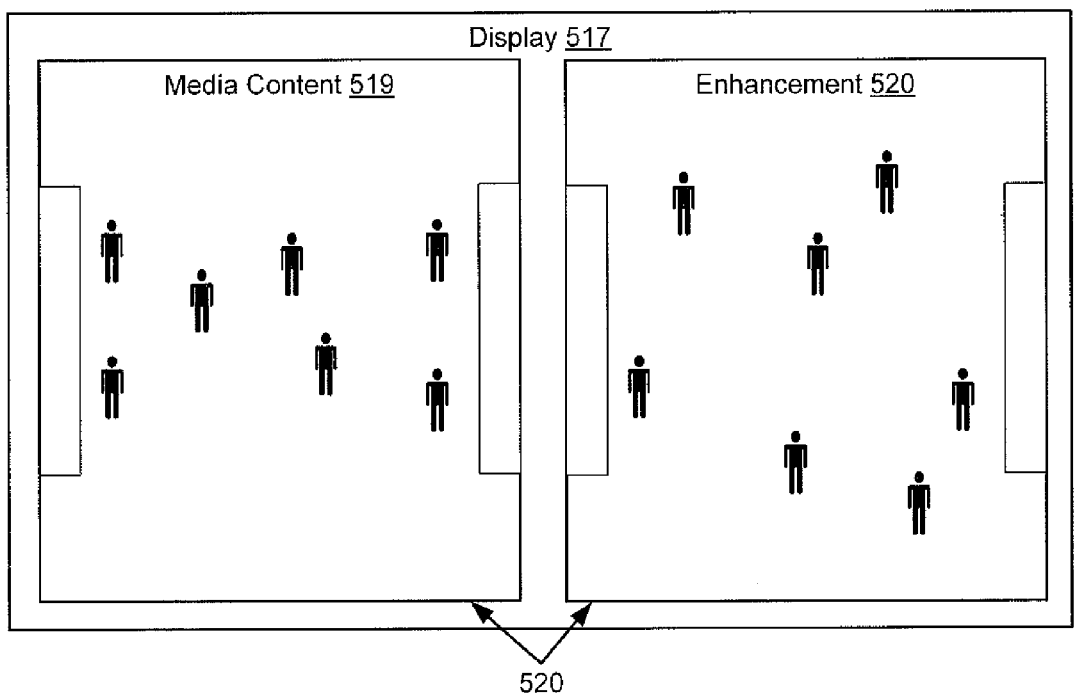
FIG. 5C presents a second example of enhancing a media content, according to one implementation of the present example.

FIG. 5C presents a second example of enhancing a media content, according to one implementation of the present example. As illustrated in FIG. 5C, display 517 is now displaying a second media content as enhancement 520 along with media content 519. For example, two users with mobile devices may be watching display 517. In such an example, one of the users may prefer the live soccer match shown as media content 519, while the second user prefers the live soccer match shown as enhancement 520. As such, a server may have utilized the preferences of the two users and enhanced media content 519 by adding in enhancement 520 so that each user is able to watch his or her preferred live soccer match.

Figure 5D:
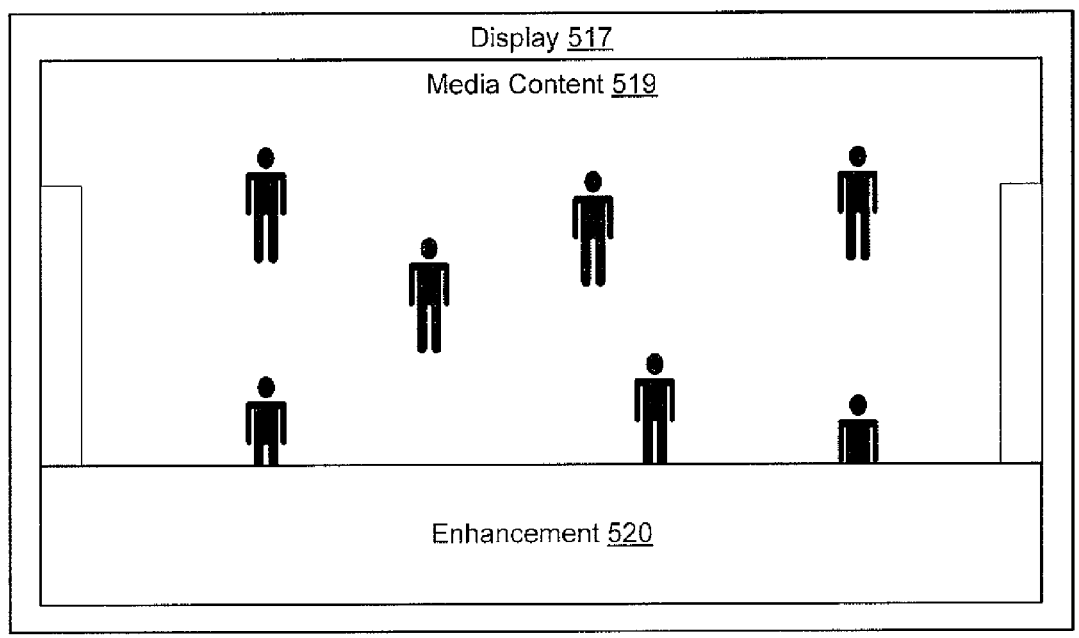
FIG. 5D presents a third example of enhancing a media content, according to one implementation of the present example.

FIG. 5D presents a third example of enhancing a media content, according to one implementation of the present example. As illustrated in FIG. 5D, media content 519 being displayed on display 517 has been enhanced by enhancement 520 on the bottom of display 517, where enhancement 520 includes a text overlay. As such, enhancement 520 may include any content that is specific to a user watching media content 519. For example, enhancement 520 may include sport scores for the user's favorite sports teams, or statistics for the players of the user's fantasy team.

Figure 6:
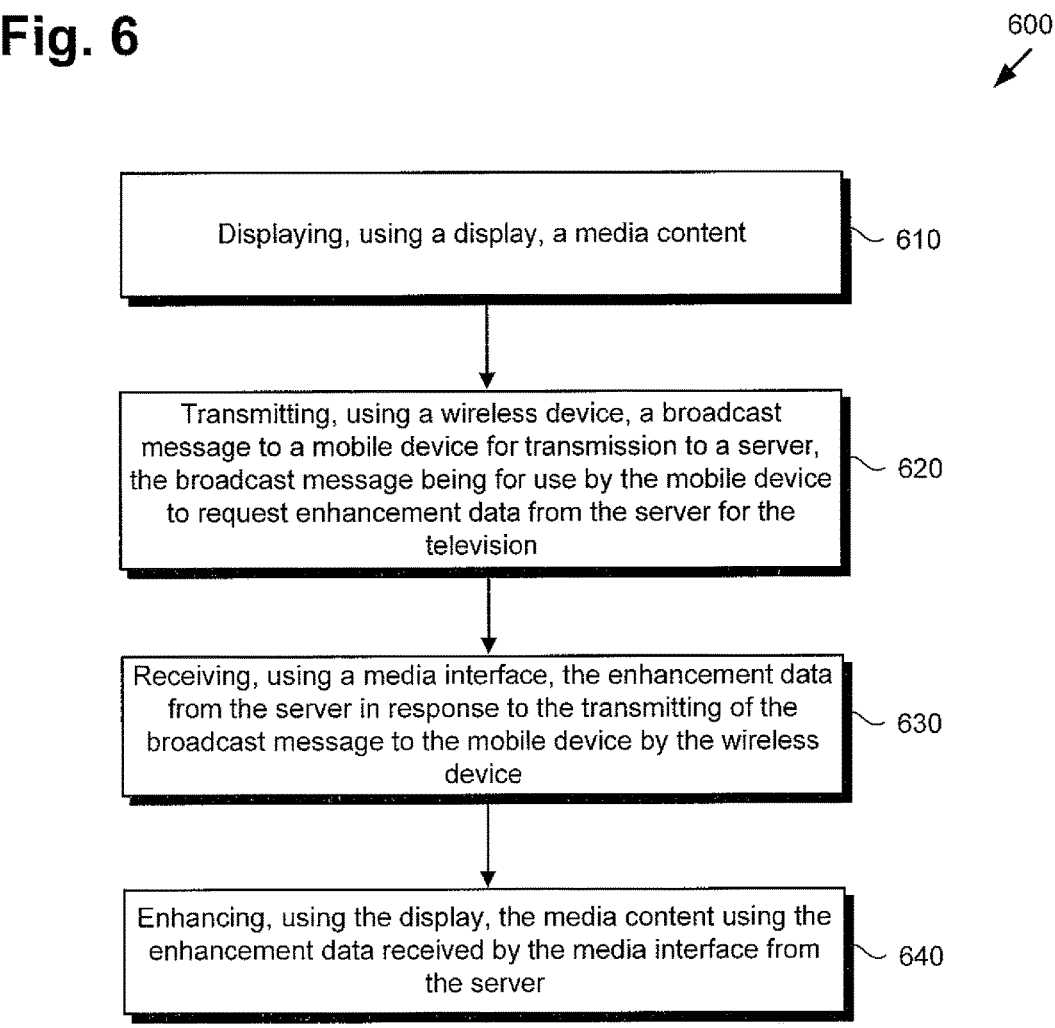
FIG. 6 shows a flowchart illustrating a method for utilizing a television for the enhancement of television with wireless broadcast messages, according to one implementation of the present disclosure.

FIG. 6 shows a flowchart illustrating a method for utilizing a television for the enhancement of television with wireless broadcast messages, according to one implementation of the present disclosure. The approach and technique indicated by flowchart 600 are sufficient to describe at least one implementation of the present disclosure, however, other implementations of the disclosure may utilize approaches and techniques different from those shown in flowchart 600. Furthermore, while flowchart 600 is described with respect to FIGS. 1-3, the disclosed inventive concepts are not intended to be limited by specific features shown and described with respect to FIGS. 1-3. Furthermore, with respect to the method illustrated in FIG. 6, it is noted that certain details and features have been left out of flowchart 600 in order not to obscure the discussion of inventive features in the present application.

Referring now to flowchart 600 of FIG. 6, flowchart 600 includes displaying, using a display, a media content (610). For example, television 110/210/310 may display, using display 217/317, media content 219/319. As discussed above, media content 219/319 may include, but is not limited to, a creative media work or project, such as a video clip, a full-length movie or animation, an episode of a drama or television series, a live or recorded sporting event, live or recorded news programs, or any other type of audiovisual work or content that can be played using television 110/210/310. For example, media content 219/319 may include a television program broadcast from a television broadcasting network.

Flowchart 600 also includes transmitting, using a wireless device, a broadcast message to a mobile device for transmission to a server, the broadcast message being for use by the mobile device to request enhancement data from the server for the television (620). For example, television 110/210/310 may transmit, using communication interface 216, broadcast message 111/211 to mobile device 130/230/330 for transmission to server 150/250/350, broadcast message 111/211 being for use by mobile device 130/230/330 to request enhancement data 151/351 from server 150/250/350 for television 110/210/310. As discussed above, in one implementation, television 110/210/310 may transmit broadcast message 111/211 to mobile device 130/230/330 using Bluetooth protocols. In such an implementation, broadcast message 111/211 may correspond to an advertisement transmitted by television 110/210/310.

Flowchart 600 also includes receiving, using the media interface, the enhancement data from the server in response to the transmitting of the broadcast message to the mobile device by the wireless device (630). For example, television 110/210/310 may receive, using media interface 321, enhancement data 151/351 from server 150/250/350 in response to the transmitting of broadcast message 111/211 to mobile device 130/230/330 by communication interface 216. As discussed above, television 110/210/310 may receive enhancement data 151/351 from server 150/250/350 using the Internet.

Flowchart 600 also includes enhancing, using the display, the media content using the enhancement data received by the media interface from the server (640). For example, television 110/210/310 may enhance, using display 217/317, media content 219/319 using enhancement data 151/351 received by media interface 321 from server 150/250/350. As discussed above, enhancement data 151/351 may include, but is not limited to, a dynamic overlay (such as text or an image) that is placed over media content 219/319, a second media content that is displayed along with media content 219/319, or removal of part of media content 219/319 if media content 219/319 is not appropriate for user 101.

Figure 7:
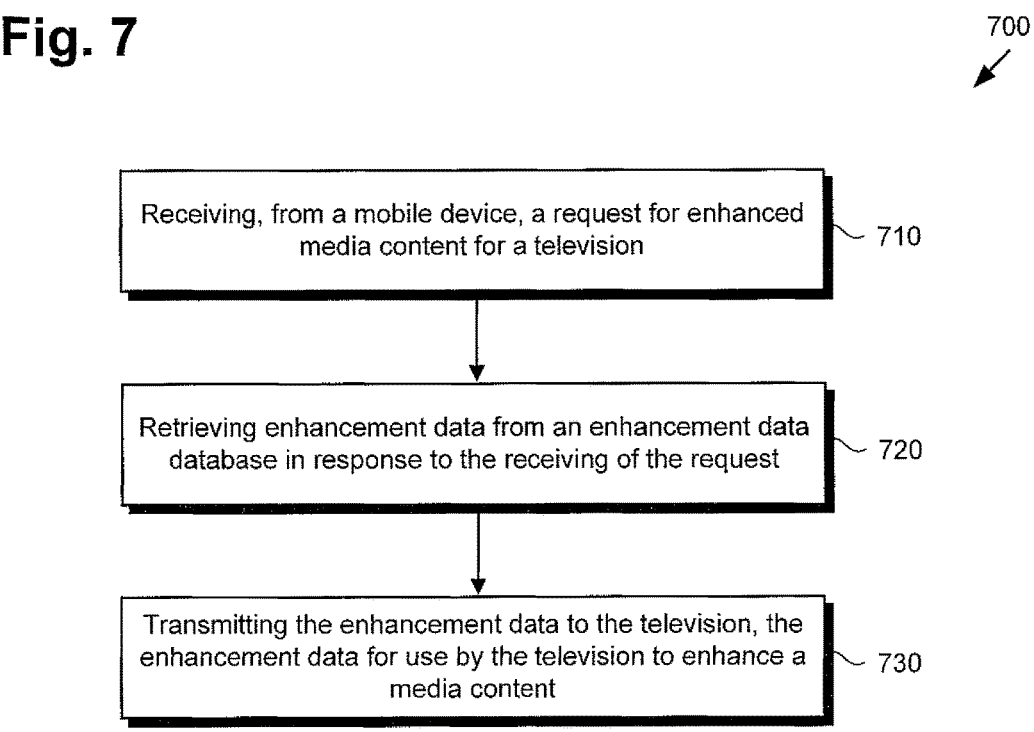
FIG. 7 shows a flowchart illustrating a method for utilizing a server for the enhancement of television with wireless broadcast messages, according to one implementation of the present disclosure.

FIG. 7 shows a flowchart illustrating a method for utilizing a server for the enhancement of television with wireless broadcast messages, according to one implementation of the present disclosure. The approach and technique indicated by flowchart 700 are sufficient to describe at least one implementation of the present disclosure, however, other implementations of the disclosure may utilize approaches and techniques different from those shown in flowchart 700. Furthermore, while flowchart 700 is described with respect to FIGS. 1-3, the disclosed inventive concepts are not intended to be limited by specific features shown and described with respect to FIGS. 1-3. Furthermore, with respect to the method illustrated in FIG. 7, it is noted that certain details and features have been left out of flowchart 700 in order not to obscure the discussion of inventive features in the present application.

Referring now to flowchart 700 of FIG. 7, flowchart 700 includes receiving, from a mobile device, a request for enhanced media content for a television (710). For example, processor 352 of server 150/250/350 may receive, from mobile device 130/230/330, request 132/232/332 for enhancement data 151/351 for television 110/210/310. As discussed above, request 132/232/332 may include television identification 112/212, media content identification 113/213, media content time 114/214, and user identification 133/233.

Flowchart 700 also includes retrieving enhancement data from an enhancement data database in response to the receiving of the request (720). For example, processor 352 of server 150/250/350 may retrieve enhancement data 151/351 from television enhancement database 360 in response to receiving request 132/232/332. As discussed above, server 150/250/350 may select enhancement data 151/351 based on request 132/232/332 and user data 356.

Flowchart 700 also includes transmitting the enhancement data to the television, the enhancement data for use by the television to enhance a media content (730). For example, processor 352 of server 150/250/350 may transmit enhancement data 151/351 to television 110/210/310, enhancement data 151/351 for use by television 110/210/310 to enhance media content 219/319.

Figure 8:
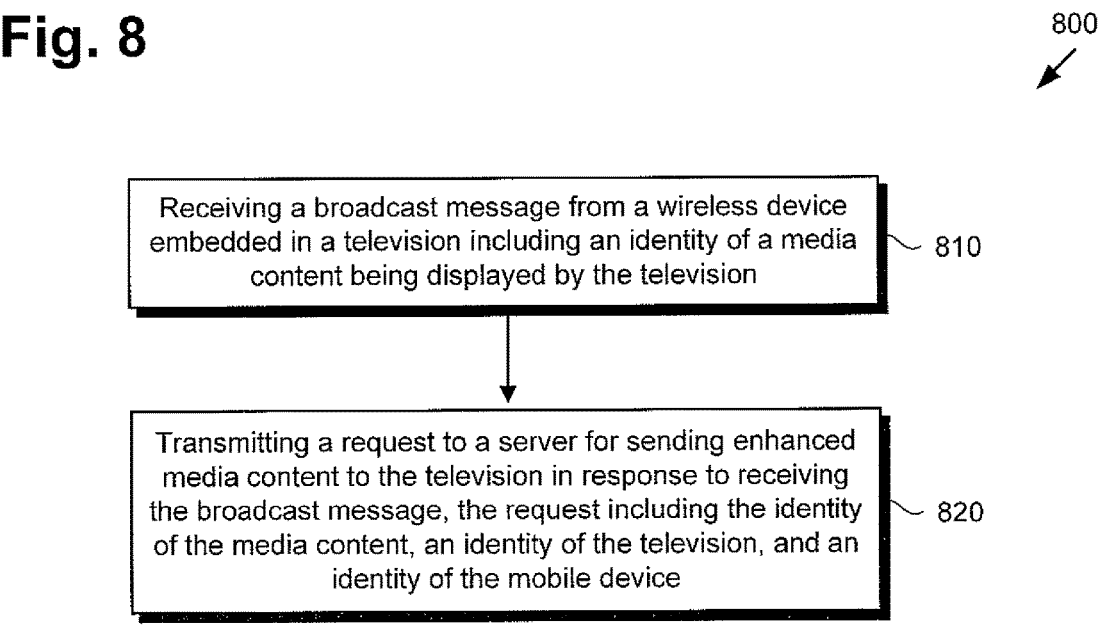
FIG. 8 shows a flowchart illustrating a method for utilizing a mobile device for the enhancement of television with wireless broadcast messages, according to one implementation of the present disclosure.

FIG. 8 shows a flowchart illustrating a method for utilizing a mobile device for the enhancement of television with wireless broadcast messages, according to one implementation of the present disclosure. The approach and technique indicated by flowchart 800 are sufficient to describe at least one implementation of the present disclosure, however, other implementations of the disclosure may utilize approaches and techniques different from those shown in flowchart 800. Furthermore, while flowchart 800 is described with respect to FIGS. 1-3, the disclosed inventive concepts are not intended to be limited by specific features shown and described with respect to FIGS. 1-3. Furthermore, with respect to the method illustrated in FIG. 8, it is noted that certain details and features have been left out of flowchart 800 in order not to obscure the discussion of inventive features in the present application.

Referring now to flowchart 800 of FIG. 8, flowchart 800 includes receiving a broadcast message from a wireless device embedded in a television including an identity of a media content being displayed by the television (810). For example, processor 234 of mobile device 130/230/330 may execute enhancement application 131/231 to receive broadcast message 111/211 from communication interface 216 embedded in television 110/210/310 including media content identification 113/213 of media content 219/319 being displayed by television 110/210/310. As discussed above, in one implementation, mobile device 130/230/330 may receive broadcast message 111/211 using Bluetooth protocols, where broadcast message 111/211 includes an advertisement.

Flowchart 800 also includes transmitting a request to a server for sending enhancement media content to the television in response to receiving the broadcast message, the request including the identity of the media content, an identity of the television, and an identity of the mobile device (820). For example, processor 234 of mobile device 130/230/330 may execute enhancement application 131/231 to send request 132/232/332 to server 150/250/350 for sending enhancement data 151/351 to television 110/210/310 in response to receiving broadcast message 111/211, request 132/232/332 including media content identification 113/213, television identification 112/212, and user identification 133/233. As discussed above, user identification 133/233 may either include the identity of user 101 in possession of mobile device 130/230/330, or user identification 133/233 may include the identity of mobile device 130/230/330.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A television comprising:
a display configured to display a media content;
a wireless device configured to transmit a broadcast message to a plurality of mobile devices of a plurality of users who are concurrently viewing the television, the broadcast message including an identity of the television and an identity of the media content and being used by the plurality of the mobile devices to send a request for aggregated enhancement data to a server for the television, wherein each request sent by the plurality of the mobile devices includes the identity of the television that is to receive the aggregated enhancement data, and further includes an identity of a user of each of the plurality of the mobile devices, wherein generation of the aggregated enhancement data is based on the identity of the user; and
a media interface configured to receive the aggregated enhancement data from the server in response to the transmitting of the broadcast message to the plurality of the mobile devices requesting the server to send the aggregated enhancement data to the television;
wherein the display is further configured to enhance the media content using the aggregated enhancement data received by the media interface from the server, wherein the aggregated enhancement data includes a group specific data selected based on the plurality of users, and wherein enhancing the media content using the aggregated enhancement data includes adding a plurality of media content overlays to the media content, and wherein each of the plurality of media content overlays comprises enhancement data specific to one of the plurality of users.

2. The television of claim 1, wherein the broadcast message is transmitted to the plurality of the mobile devices using a Bluetooth protocol.

3. The television of claim 1, wherein the broadcast message includes a media content time corresponding to the duration of time the media content has been playing.

4. The television of claim 1, wherein the group specific data is selected by the server based on a media use history of the plurality of users of the plurality of the mobile devices.

5. The television of claim 1, wherein the group specific data is selected by the server based on preferences of the plurality of users of the plurality of the mobile devices.

6. The television of claim 1, wherein the broadcast message is for reception by the plurality of the mobile devices and transmission by the plurality of the mobile devices along with identities of the plurality of the mobile devices to the server.

7. The television of claim 1, wherein enhancing the media content using the aggregated enhancement data includes displaying an additional media content on the display.

8. A server comprising:
a memory storing an aggregated enhancement data database; and
a processor configured to:
receive a plurality of requests for enhanced media content for a television from a plurality of mobile devices of a plurality of users who are concurrently viewing the television that sends a broadcast message, the broadcast message including an identity of the television and an identity of the media content, wherein each of the plurality of requests includes the identity of the television that is to receive the aggregated enhancement data, and further includes an identity of a user of each of the plurality of the mobile devices, wherein generation of the aggregated enhancement data is based on the identity of the user;
retrieve aggregated enhancement data from the aggregated enhancement data database in response to the receiving of the plurality of requests; and
transmit the aggregated enhancement data to the television, the aggregated enhancement data for use by the television to enhance a media content, wherein the aggregated enhancement data includes a group specific data selected based on the plurality of users;
wherein enhancing the media content using the aggregated enhancement data includes adding a plurality of media content overlays to the media content, and wherein each of the plurality of media content overlays comprises enhancement data specific to one of the plurality of users.

9. The server of claim 8, wherein the memory further stores a media use history for the plurality of the users of the plurality of the mobile devices, and wherein the aggregated enhancement data is selected based on the media use history of the users.

10. The server of claim 8, wherein the memory further stores preferences for the plurality of the users of the plurality of the mobile devices, and wherein the aggregated enhancement data is selected based on the preferences of the users.

11. The server of claim 8, wherein enhancing the media content includes displaying an additional media content next to the media content on the display.

12. The server of claim 8, wherein the plurality of requests includes the identity of the media content displayed on the television, and wherein the processor retrieves the aggregated enhancement data from the aggregated enhancement data database based in part on the identity of the media content.

13. A mobile device comprising:
a memory storing a software application; and
a processor configured to execute the software application to:
receive a broadcast message from a wireless device embedded in a television, the broadcast message including an identity of a media content being displayed by the television and an identity of the television; and
transmit a request, generated using the broadcast message, to a server for sending enhanced media content as part of an aggregated request to the television, the request including the identity of the media content, an identity of the television that is to receive the enhanced media content and an identity of a user of the mobile device, wherein the aggregated request includes a plurality of requests transmitted by a plurality of mobile devices used by a plurality of users concurrently using the television;
wherein the enhanced media content comprises aggregated enhancement data including a group specific data selected by the server based on the identity of each of the plurality of users of the plurality of mobile devices, and wherein sending the enhanced media content using the aggregated enhancement data includes adding a plurality of media content overlays to the media content, and wherein each of the plurality of media content overlays comprises enhancement data specific to one of the plurality of users.

14. The mobile device of claim 13, wherein the broadcast message is received from the television using a Bluetooth protocol.

15. The mobile device of claim 13, wherein the broadcast message includes a time corresponding to the duration of time the media content has been playing.

16. The mobile device of claim 13, wherein aggregated enhancement data including a group specific data is selected by the server based on a media use history of the plurality of users of the plurality of mobile devices.

17. The mobile device of claim 13, wherein aggregated enhancement data including a group specific data is selected by the server based on preferences of the plurality of users of the plurality of mobile devices.

18. The mobile device of claim 13, wherein the identity of each user is determined based on the identity of each mobile device.

* * * * *